United States Patent

[11] 3,562,441

[72] Inventor Hermann Bretschneider
Vienna, Austria
[21] Appl. No. 666,049
[22] Filed Sept. 7, 1967
[45] Patented Feb. 9, 1971
[73] Assignee U.S. Philips Corporation
New York, N.Y.
a corporation of Delaware. by mesne assignments
[32] Priority Sept. 9, 1966
[33] Austria
[31] A/8519/66

[54] RECORDING AND/OR REPRODUCING APPARATUS WITH CIRCUIT TO INSERT AC SIGNAL INTO AMPLIFIER TO INDICATE BATTERY CONDITION
11 Claims, 5 Drawing Figs.

[52] U.S. Cl. .......... 179/100.1, 179/100.2
[51] Int. Cl. .......... G11b 15/46, G11b 19/28
[50] Field of Search .......... 179/100.15, 100.4E, 100.25; 318/331, 332, 345

[56] References Cited

UNITED STATES PATENTS

| | | | |
|---|---|---|---|
| 3,202,898 | 8/1965 | Genning et al. | 318/345 |
| 2,113,226 | 4/1938 | Young | 179/100.4 |
| 3,424,871 | 1/1969 | Dembacher | 179/100.2 |

*Primary Examiner*—J. Russell Goudeau
*Attorney*—Frank R. Trifari

ABSTRACT: A battery operated tape recorder includes a speed control element in series with the tape drive motor. The speed control element produces an AC signal voltage in the audio frequency range in the motor circuit. A manually operable switch establishes an AC connection between the motor circuit and the recorder amplifier for coupling the audio frequency signal to the recorder loudspeaker. The condition of the battery can be easily checked by merely operating the manual switch. The presence or absence of an audio tone indicates the condition of the battery.

INVENTOR.
HERMANN BRETSCHNEIDER
BY
Frank R. Trifari
AGENT

INVENTOR.
HERMANN BRETSCHNEIDER
BY
Frank R. Jinfani
AGENT

RECORDING AND/OR REPRODUCING APPARATUS WITH CIRCUIT TO INSERT AC SIGNAL INTO AMPLIFIER TO INDICATE BATTERY CONDITION

The present invention relates generally to a sound recording and reproducing system and more particularly to a battery operated recording and/or reproducing apparatus having improved means for checking the condition of the battery. This type of apparatus generally includes an amplifier for recording and/or acoustically reproducing electric signals, a battery supplied motor, and a speed control member connected in series with said motor.

Such apparatus must frequently satisfy two requirements, i.e. on the one hand, it must be capable of providing given points of the record carrier with marks in order to detect, for example, where a recording begins or a correction of a recording is to be carried out. On the other hand, the apparatus must also provide a means for checking the instantaneous battery voltage so that rundown batteries may be exchanged in time.

If a device is operated from an AC supply, the first requirement can readily be satisfied by utilizing the mains voltage for the production of marking pulses. In battery-supplied apparatus, this simple technique is excluded and more extensive steps must be taken to produce marking pulses, for example, the provision of arrangements having permanent magnets, separate oscillators and the like.

It has been proposed to solve the second problem by applying the switching pulses produced by a centrifugal governor, which is provided to keep constant the speed of a battery supplied motor, through an RC combination to the base of a transistor, the collector circuit of which includes an indicator which responds when the battery voltage has fallen below a predetermined value. The indicator is constituted by instruments, visible indications and the like so that such a device is comparatively complicated, especially for small apparatus. The invention provides a particularly simple solution of the two above problems. According to the invention, provision is made between the input of a stage of the amplifier and the junction of the motor and control member, of a connection for alternating current which can be switched into circuit by means of a manually operable switch and which is closed through the reference potentials of the current circuits of amplifier the and motor. The invention is based on recognition of the fact that an AC component is produced in any motor circuit in which some speed control member or other is connected in series with the motor, which component can be utilized for switching particular processes. On the one hand this AC component can be used as a marking signal for a recording and on the other hand, since its amplitude and/or frequency vary with the battery voltage, it provides an indication in the form of an acoustic signal of the state of charge of the battery.

In a further advantageous embodiment according to the invention, the control member in the motor circuit includes the emitter-collector path of a control transistor, the collector current of which is continuously controlled by means of a control circuit in accordance with the motor voltage and/or the motor current. In this embodiment, the circuit of the AC connection comprises the emitter-collector path of the control transistor and a potentiometer constituted by a threshold device, for example, a semiconductor diode, and a resistor connected for direct current in parallel with said emitter-collector path, the AC connection extending from a tap on this potentiometer to the amplifier. Thus, when the threshold device responds, the motor circuit no longer passes an AC component to the amplifier. As a result, a sharp boundary is obtained which clearly indicates the decrease of the battery voltage below a predetermined value, in which event marks can no longer be provided so that inexact marking signals are prevented from being recorded.

Advantageously, in an apparatus which can be commutated from the operative position "recording" to the position "-playback" and conversely, the switch can be used on the one hand to provide the record carrier with marks and on the other hand to check the value of the battery voltage both in the position"recording" and in the position "playback." In this case, the two above conditions are fulfilled in one apparatus.

The invention will now be described more fully with reference to the drawing, which shows a few embodiments, to which the invention is not limited, however.

Figure 1:
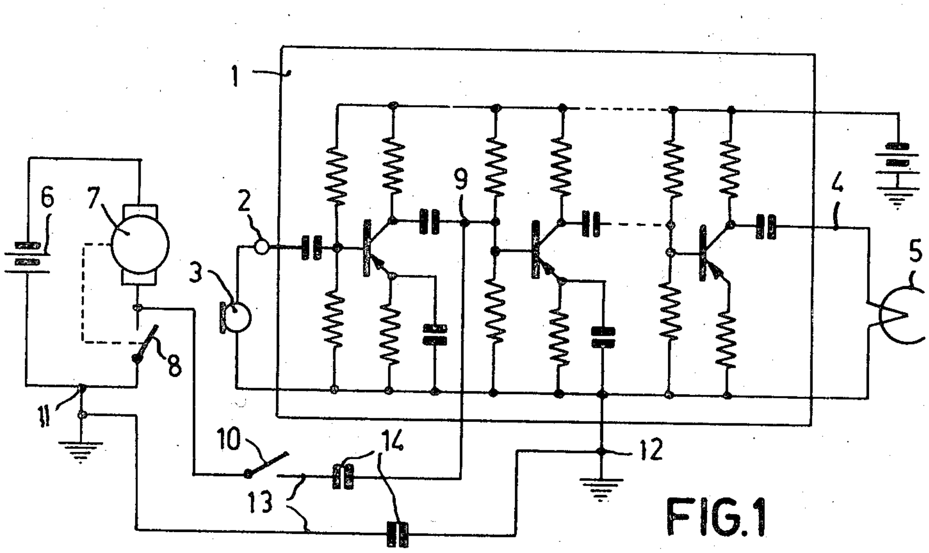
FIG. 1 shows a recording apparatus.

In FIG. 1, reference numeral 1 denotes a multistage amplifier to the input 2 of which is connected a microphone 3, while to its output 4 is connected a magnetic head 5 for recording the electric signals, amplified, by the amplifier onto a magnetizable record carrier (not shown). The record carrier is moved by means of the motor 7 supplied by the battery 6. The circuit of this motor includes, as a control member for keeping the speed of the motor constant, a centrifugal governor 8 coupled with said motor.

As is known, the centrifugal governor 8 operates so that it opens the motor circuit when the speed is unduly high and closes said circuit when the speed decreases. This implies that with a high battery voltage the centrifugal governor alternately opens and closes the current circuit at a frequency of approximately 60 to 80 c./sec., whereas this circuit is permanently closed only when the battery voltage has decreased to a value at which the nominal speed is just obtained. When this state is attained, the battery has run down. Thus, during the lifts of the battery, the centrifugal governor produces an intermittent current through the motor, i.e. an alternating current the frequency of which slowly decreases to zero as the battery runs down.

According to the invention. provision is made, between the input 9 of one stage of the amplifier 1 and the junction of motor 7 and control member 8, of an AC connection 13 which can be switched into the circuit by a manually operable switch 10 and which is closed via the reference potentials 11, 12 of the amplifier and motor circuits. Thus, when the switch 10 is closed, the alternating voltage produced at the control member, i.e. at the centrifugal governor 8 described above, is applied through blocking capacitors 14 to the amplifier 1, amplified by this amplifier, supplied to the magnetic head 5 and then recorded on the record carrier. Thus, marks in the form of alternating voltage pulses can be recorded on the record carrier by a selective actuation of the switch 10.

Figure 2:
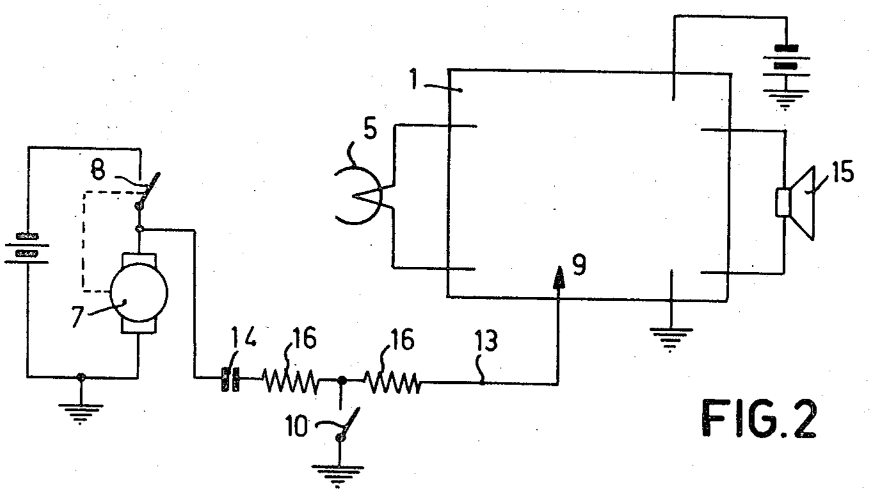
FIG. 2 shows a reproducing apparatus having a motor in which the speed is controlled by a centrifugal governor, the AC component being derived in the former case from the centrifugal governor and in the latter case from the motor.

FIG. 2 shows an apparatus for reproducing signals which are read by a magnetic head 5 from a record carrier (not shown) and are applied through an amplifier 1 to a loudspeaker 15. As in FIG. 1, the record carrier is driven by a motor 7 the speed of which is controlled by a centrifugal governor 8. The alternating voltage produced in the motor circuit by the centrifugal switch is derived, in the present case, from the motor 7 and applied to the amplifier 1 through the AC connection 13, comprising a blocking capacitor 14 and blocking resistors 16. The switch 10 is a short circuit switch. As soon as it is opened manually, the AC connection between the motor circuit and the amplifier is established.

When the centrifugal governor opens and closes the motor circuit, a chopped direct voltage, hence an alternating voltage, is produced in the motor. This means, however, that in accordance with the embodiments described above, an alternating voltage is available as long as the battery is still operative and can provide the required speed of the motor. Therefore, when the switch 10 is opened and a tone is heard through the loudspeaker, this is an indication that the battery is still operative. The lower the tone, the nearer is the end of the life of the battery. When no tone is heard any longer, the battery must be exchanged. Thus, an extremely simple check of the state of charge of the battery and hence of the usability of the apparatus is obtained.

In this embodiment, the alternating voltage is derived from the motor and in the embodiment of FIG. 1 from the centrifugal governor. This makes no difference in the operation of the arrangement. The choice of the arrangement is only determined by the part of the motor circuit which is connected to the reference potential. This choice generally depends upon grounding problems with respect to interference, the reference potential of the amplifier and the like.

Figure 3:
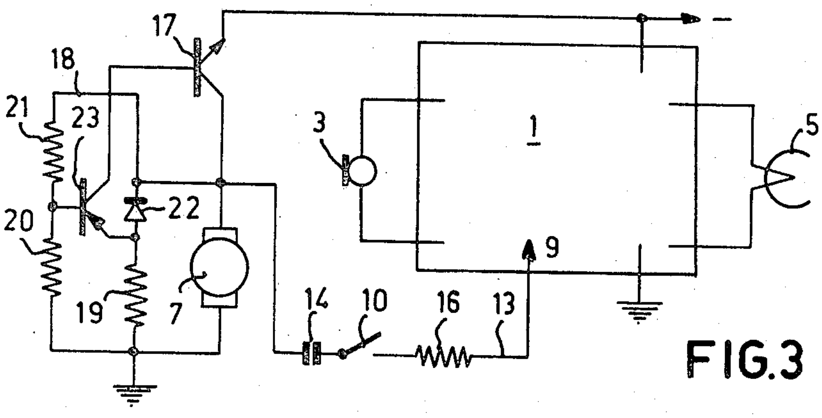
FIG. 3 shows a recording apparatus in which the motor is kept at a constant speed by an electronic control member.

FIG. 3 shows a recording apparatus in which the speed of the motor is controlled by an electronic element. For this purpose, the emitter-collector path of a control transistor 17, acting as a variable resistor is connected in known manner in series with the motor. The collector current of the transistor is continuously controlled by control circuit 18 in accordance with the motor voltage. This control circuit comprises a bridge circuit which is constituted by resistors 19, 20, 21 and a diode 22 and is supplied by the motor voltage. In this bridge, the motor voltage divided by the resistors 20, 21 is compared with a rated voltage produced by the resistor 19 and the diode 22. The deviation from the rated voltage are converted in a transistor 23 into a control current for transistor 17. Thus, with a high battery voltage, the transistor 17 constitutes a high resistance because it passes a small current, which resistance decreases with a decrease in battery voltage, whereupon the transistor passes a larger current. After the battery voltage has decreased to a value which corresponds to the motor voltage for the nominal speed, the transistor 17 is fully conducting, i.e. it is in the so called knee range in which the resistance of the emitter-collector path is negligible.

It also has been found that with this mode of speed control, which in contrast to the control by a centrifugal governor, is effected continuously, an alternating voltage is also produced in the motor circuit even though the arrangement is supplied by direct current. This is due to the fact that each brush of the commutator of the motor establishes a transient connection between two adjacent commutator segments at the transitional area of said segments and hence connects in parallel the armature windings which are connected to these adjacent commutator segments. When the brush is again in contact with only one commutator segment, only the armature windings connected to this segment are operative. This means, however, that at each transition the double number of windings is operative so that the impedance of the motor circuit decreases. However, if such a periodically varying impedance is supplied by a direct current source through a preresistor, an AC component is produced in the current circuit, the value of which varies with the value of the preresistor and of the variation of the impedance. If, for example, the preresistor has a zero value, no AC component is produced if the internal resistance of the battery can be neglected. In practice, due to the fact that the transistor 17 acts as a variable resistor, a frequency of approximately 50 c./sec. is obtained in the motor current circuit in accordance with the motor used. The amplitude of this frequency varies with the extent to which the motor is controlled.

In the apparatus of FIG. 3, when the switch 10 is closed the alternating voltage thus produced in the motor 7 is supplied to the amplifier 1 through the AC connection 13. Marks can then be formed, as in the arrangement of FIG. 1, but this embodiment has the additional advantage that these marks have a constant frequency that does not vary with the battery voltage.

Figure 4:
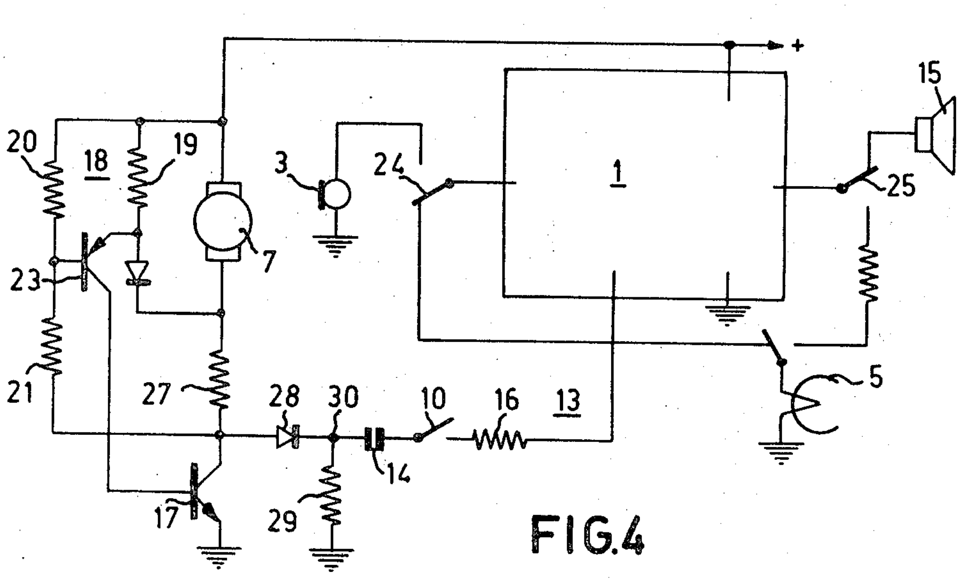
FIGS. 4 and 5 show a recording and a reproducing apparatus, respectively, in which the speed of the motor is controlled by electronic means, but which have different threshold devices.

FIG. 4 shows an apparatus which is similar to that of FIG. 3 and which is constructed as a recording and reproducing apparatus, for which purpose the amplifier 1 can be set by means of switches 24, 25 and 26 both to the operating position "recording" and to the position "playback." In this embodiment, the speed is controlled not only in dependence upon the motor voltage, but also upon the motor current and, as is known, the motor circuit or the control circuit 18 includes for this purpose a resistor 27.

When this apparatus is set to the position "recording" as described above, marks can be recorded on the record carrier by means of the switch 10 due to the fact that the alternating voltage produced at the emitter-collector path of the transistor 17 is applied to the amplifier 1.

When the apparatus is set to the position "playback," this alternating voltage is applied to the loudspeaker 15 upon actuation of the switch 10. Since the resistance of the emitter-collector path of the transistor 17 varies with the battery voltage, the amplitude of the alternating voltage at this transistor and hence the volume of the tone emitted by the loudspeaker 15, also vary. When the battery has run down the said resistance is practically zero so that no the tone is no longer heard. In order to obtain a clear difference between the states in which a tone is still heard and in which no tone is heard any longer, a potentiometer constituted by a threshold device 28 and a resistor 29 is connected in parallel with the emitter-collector path of transistor 17. The AC connection 13 extends from the tap 30 on this potentiometer to the amplifier 1. The threshold device 28 is a diode which, in the past direction, has a threshold voltage exceeding the emitter-collector voltage of the transistor 17 in the knee range. Thus, the diode 28 is cut off before the emitter-collector path reaches its knee.

Consequently, if the battery voltage is high, the direct voltage at transistor 17 is high and the diode 28 is conducting so that, when the switch 10 is actuated to check the battery voltage, an alternating voltage of high amplitude is applied to the amplifier 1. If the battery voltage decreases, the direct voltage at transistor 17 also decreases. When the threshold voltage of the diode 28 is attained, the latter becomes high ohmic so that, due to the effect of the voltage divider, only a fraction of the alternating voltage is applied to the amplifier 1. Thus, a sharp and clearly observable boundary is obtained between the state in which a tone is still heard and that in which no tone is heard any longer, which corresponds to a charged and an already discharged battery, respectively.

The above-described apparatus provides a simple and compact arrangement for recording marks on the record carrier and checking the battery voltage due to the fact that the switch 10 can be actuated both in the operating position "recording" and in the position "playback." Since the arrangement described requires only a small portable amount of equipment, it is particularly suitable for use in small apparatus of the said kind.

Figure 5:
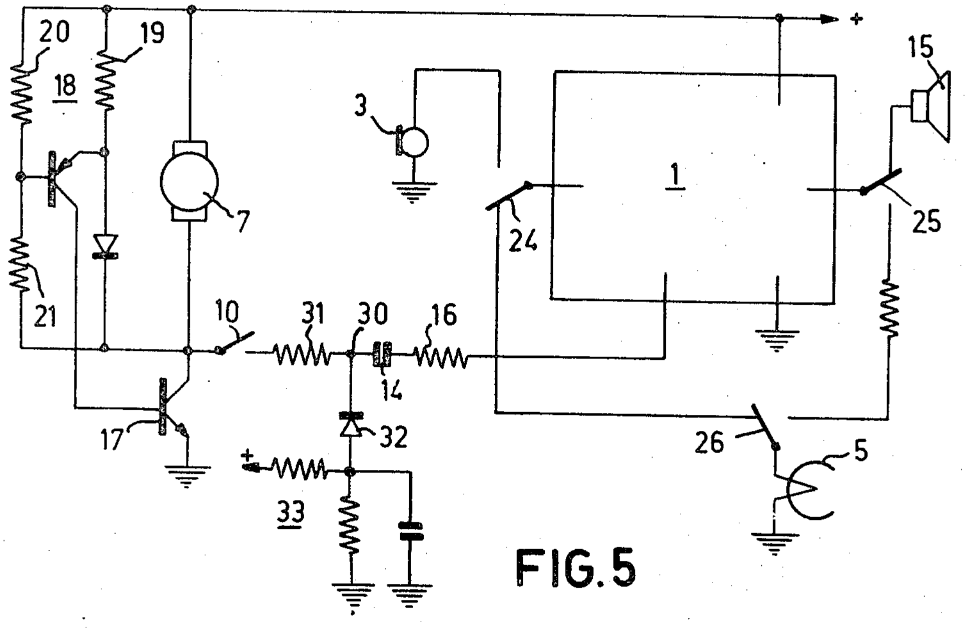

FIG. 5 shows a recording and/or reproducing apparatus similar to that of FIG. 4, but with a differently constructed potentiometer. The latter is constituted in this case by a resistor 31 and a diode 32. By means of a potentiometer 33, decoupled for alternating current, a bias voltage is applied to this diode, such that it is cut off with the switch 10 closed and a sufficiently high battery voltage 20, i.e. a high direct voltage at transistor 17. In this state, the alternating voltage can be freely applied to the amplifier 1. If the direct voltage at transistor 17 is lower than the bias voltage at the diode, which corresponds to a poor battery, the diode 32 becomes conducting and the alternating voltage at the tap 30 is short circuited. Thus, the boundary between a usable and an unusable battery is again clearly indicated. This arrangement has the advantage that the value of the threshold response can be readily adjusted by adjusting the voltage divider 33.

Of course, a series of modifications of the described embodiments are possible without departing from the scope of the invention for example, with respect to the construction of the AC connection, to the position of the switch in this connection, and the like.

I claim:

1. In a sound transducing apparatus having an amplfier for recording and/or acoustically reproducing electric signals and a battery supplied motor, the improvement comprising a motor speed control element connected in series with said motor, alternating current connection means adapted to be connected in circuit between the input of one stage of the amplifier and a junction point in the motor circuit that includes said control element and where and AC voltage is developed, and circuit means including a manually operable switch for selectively connecting said AC connection means in circuit via the reference potentials of the amplifier and motor circuits thereby to couple said AC voltage to said amplifier input.

2. An apparatus as claimed in claim 1 wherein the control element comprises a control transistor with its emitter-collector path connected in the motor circuit, means coupling the base of said transistor to the motor circuit so that the collector current is continuously controlled in accordance with the motor voltage and wherein the current circuit of the AC connection means includes the emitter-collector path of the control transistor, said apparatus further comprising a potentiometer comprising a threshold device and a resistor connected for direct current in parallel with the transistor emitter-collector path, the AC connection extending from a tap on said potentiometer to said amplifier input.

3. An apparatus as claimed in claim 1 further comprising switching means for switching said apparatus between the recording position and the playback position, the manual switch being operable to connect said AC connection means in circuit so as to record marks on the record carrier in the recording position and to check the value of the battery voltage in the playback position by selectively coupling said AC voltage to said amplifier input.

4. A sound transducing system comprising, a source of DC voltage, a motor adapted to drive a record carrier, a current control element adapted to pass a current in accordance with the motor speed, means connecting said voltage source, said motor and said control element in series circuit, an amplifier having an output for supplying signals to the system transducing means, a switch, AC coupling means, and circuit means including said switch for selectively connecting said AC coupling means between a given input of the amplifier and a junction point in the motor circuit at which an AC voltage is developed thereby to couple said AC voltage from the junction point to said amplifier input.

5. A system as claimed in claim 4 wherein said AC coupling means comprises a capacitor connected in series with said switch between said amplifier input and said junction point.

6. A system as claimed in claim 5 wherein said control element comprises a centrifugal switch coupled to the motor shaft.

7. A system as claimed in claim 4 wherein said AC coupling means comprises a capacitor and said control element comprises a transistor connected with its emitter-collector path in said series circuit, and means coupling the base electrode of said transistor to the motor so that the collector current is continuously controlled in accordance with the motor voltage.

8. A system as claimed in claim 7 wherein said base electrode coupling means comprises a bridge circuit having input terminals connected across the motor terminals and an output coupled to said transistor base electrode.

9. A system as claimed in claim 4 wherein said control element comprises a transistor connected with its emitter-collector path in said series circuit and its base electrode controlled by the motor voltage, and wherein said AC coupling means comprises, a threshold device, an impedance element, means serially connecting said threshold device and said impedance element in parallel with the transistor emitter-collector path, and a capacitor connected in series with said switch to said amplifier input.

10. A system as claimed in claim 9 wherein said threshold device comprises a semiconductor diode, said AC coupling means further comprising means serially connecting said diode, said capacitor and said switch between said amplifier input and said motor circuit junction point.

11. A system as claimed in claim 9 wherein said DC voltage source comprises a storage battery and wherein said threshold device comprises a semiconductor diode and a source of DC bias voltage connected thereto.